United States Patent [19]

Tanaka et al.

[11] Patent Number: 5,109,811
[45] Date of Patent: May 5, 1992

[54] INTAKE SYSTEM FOR MULTI-CYLINDER ENGINE

[75] Inventors: Fusatoshi Tanaka; Toshikazu Kurokawa; Kouji Matsuura; Motoi Aoki, Hiroshima, all of Japan

[73] Assignee: Mazda Motor Corporation, Hiroshima, Japan

[21] Appl. No.: 697,376

[22] Filed: May 9, 1991

[30] Foreign Application Priority Data

May 9, 1990 [JP] Japan .................................. 2-117680

[51] Int. Cl.$^5$ .......................................... F02M 35/10
[52] U.S. Cl. .......................... 123/52 MB; 123/52 MV
[58] Field of Search ......... 123/52 M, 52 MB, 52 MC, 123/52 MV, 52 MF, 52 ML

[56] References Cited

U.S. PATENT DOCUMENTS 4,690,106 9/1987 Nakayama et al. ............ 123/52 MC
4,771,740 9/1988 Koike .............................. 123/52 MB

FOREIGN PATENT DOCUMENTS 0116020 6/1986 Japan .............................. 123/52 M
0201018 8/1990 Japan ........................... 123/52 MV Primary Examiner—David A. Okonsky
Attorney, Agent, or Firm—Fish & Richardson

[57] ABSTRACT

Each surge tank disposed over the respective cylinder head of the combustion engine is connected to the intake port of each cylinder of the combustion engine individually and independently through the independent intake passages. The independent intake passages form a space, i.e. a dead space, in association with the surge tank and the cylinder head, and a first volume chamber or a second volume chamber is disposed within the space in order to provide the dynamic effect of intake air. The dynamic effect of intake air is achieved at least either of resonance supercharging or inertia supercharging.

31 Claims, 4 Drawing Sheets

INTAKE SYSTEM FOR MULTI-CYLINDER ENGINE

BACKGROUND OF THE INVENTION

1. Field of the Invention

The present invention relates to an intake system for a multi-cylinder engine.

2. Description of Related Art

Recently, there is the increasing tendency that combustion engines can achieve dynamic effect of intake air, for example, that they perform inertia supercharging. The inertia supercharging is performed by using a surge tank, as a pressure-reversing portion where the pressure is reversed, by connecting the surge tank individually and independently to each of the cylinders through the independent intake passages. The longer the length of the independent intake passages from the respective cylinders to the pressure-reversing portion, the lower the number of revolutions of the combustion engine for supercharging in synchronism with inertia.

For instance, Japanese Patent Laid-open Publication (kokai) No. 210,219/1987 proposes an intake system in which supercharging be performed in synchronism with inertia in both a low rotation region of the combustion engine and a high rotation region thereof by switching between a relatively short intake passage and a relatively long intake passage, thereby providing the combustion engine with high and flat output torque over a wide rotation range. In such a case, it is also proposed that plural volume chambers having intake passages of different lengths between the respective volume chambers and intake ports are provided and the volume chamber is so chosen as to correspond to the number of revolutions of the combustion engine and as to be employed as a pressure-reversing portion.

It is also the growing tendency that supercharging is performed in synchronism with resonance in order to gain the dynamic effect of intake air. In order to perform the supercharging in synchronism with resonance, cylinders are so set as to allow their intake strokes to be not adjacent each other and such cylinders are combined into a group. Further, plural groups of such cylinders are provided and, for each group of the cylinders, each of the cylinders is connected individually and independently to the volume portion, such as the surge tank, through the respective independent intake passages and the volume portion for each of the groups of the cylinders are communicated to each other through a passage causing resonance.

In either case where supercharging is performed in synchronism with inertia or where supercharging is performed in synchronism with resonance, a predetermined volume portion is required. This volume portion, however, is so considerably large in volume and size that such a large volume of the volume portion presents the problem that the intake system is made compact and eventually the combustion engine is made compact as a whole.

SUMMARY OF THE INVENTION

Therefore, the object of the present invention is to provide an intake system for a multi-cylinder combustion engine for an automotive vehicle body so adapted as to make the combustion engine compact as a whole by devising the disposition of the volume portion in order to achieve the dynamic effect of intake air.

In order to achieve the aforesaid object, the present invention basically consists of an intake system for a multi-cylinder combustion engine, comprising:
- a surge tank disposed over a cylinder head of the combustion engine;
- an independent intake passage connecting the surge tank to an intake port for each of cylinders of the combustion engine; and
- a volume portion constituting a volume chamber disposed within a space formed among and surrounded by the independent intake passages, the surge tank and the cylinder head so as to gain dynamic effect of intake air.

With the arrangement for the intake system for the multi-cylinder combustion engine according to the present invention, the space formed and surrounded by the cylinder head, the independent intake passages and the surge tank can effectively be employed as a volume portion for achieving the dynamic effect of intake air.

The intake system for the multi-cylinder combustion engine according to the present invention can be applied to in-line combustion engines as well as to V-type combustion engines. For the V-type combustion engines, it is preferred that the independent intake passages, the surge tank and the volume portion are provided individually and independently for each of the left-hand and right-hand cylinder banks.

Other objects, features and advantages of the present invention will become apparent in the course of the description of the preferred embodiments, which follows, with reference to the accompanying drawings.

DESCRIPTION OF THE PREFERRED EMBODIMENTS

The present invention will be described more in detail with reference to the accompanying drawings. In this embodiment, the air intake system according to the present invention is applied to a 12-cylinder combustion engine.

Figure 1:
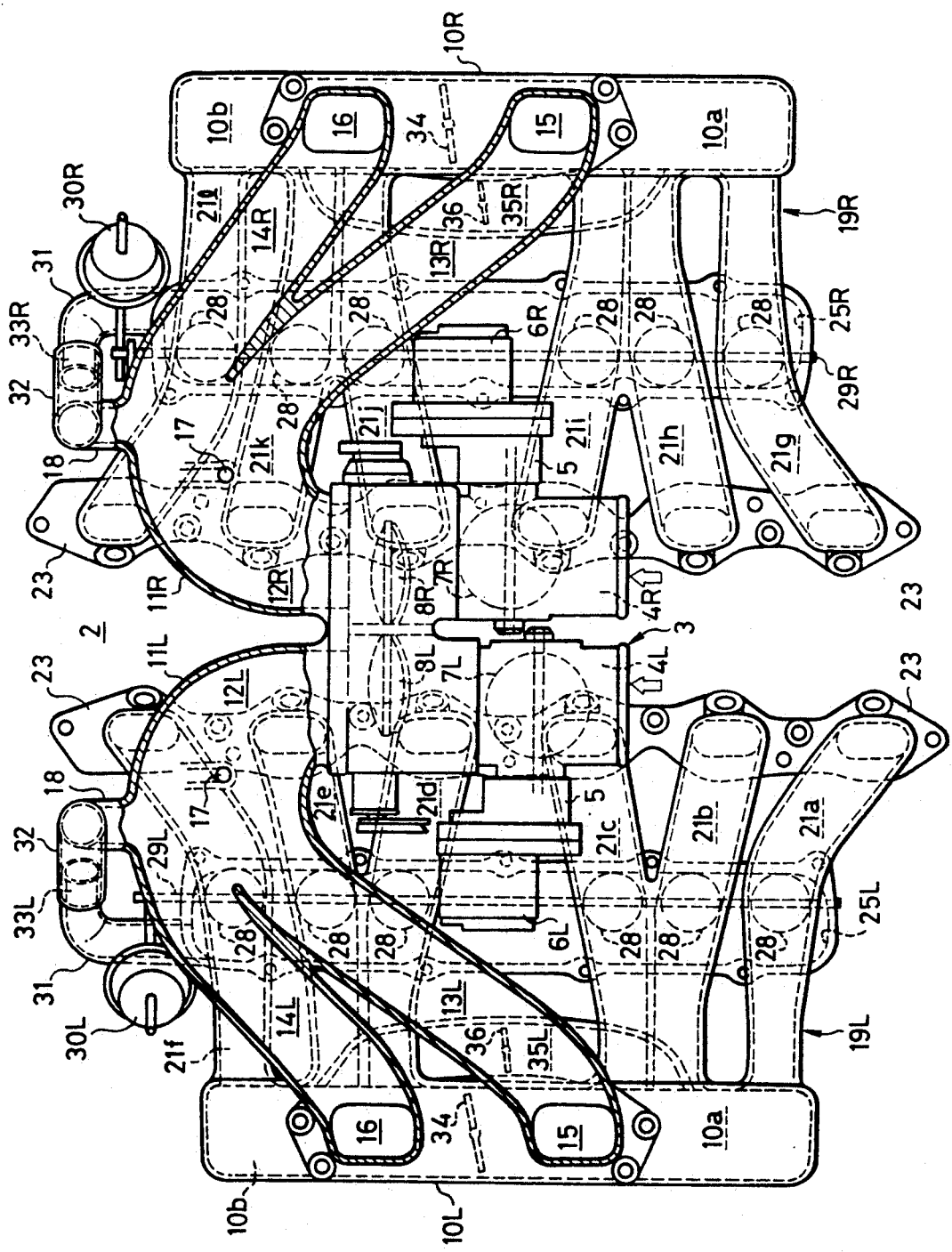
FIG. 1 is a partially sectional plan view showing an intake manifold assembly according to an embodiment of the intake system for the multi-cylinder combustion engine of the present invention.
Figure 2:
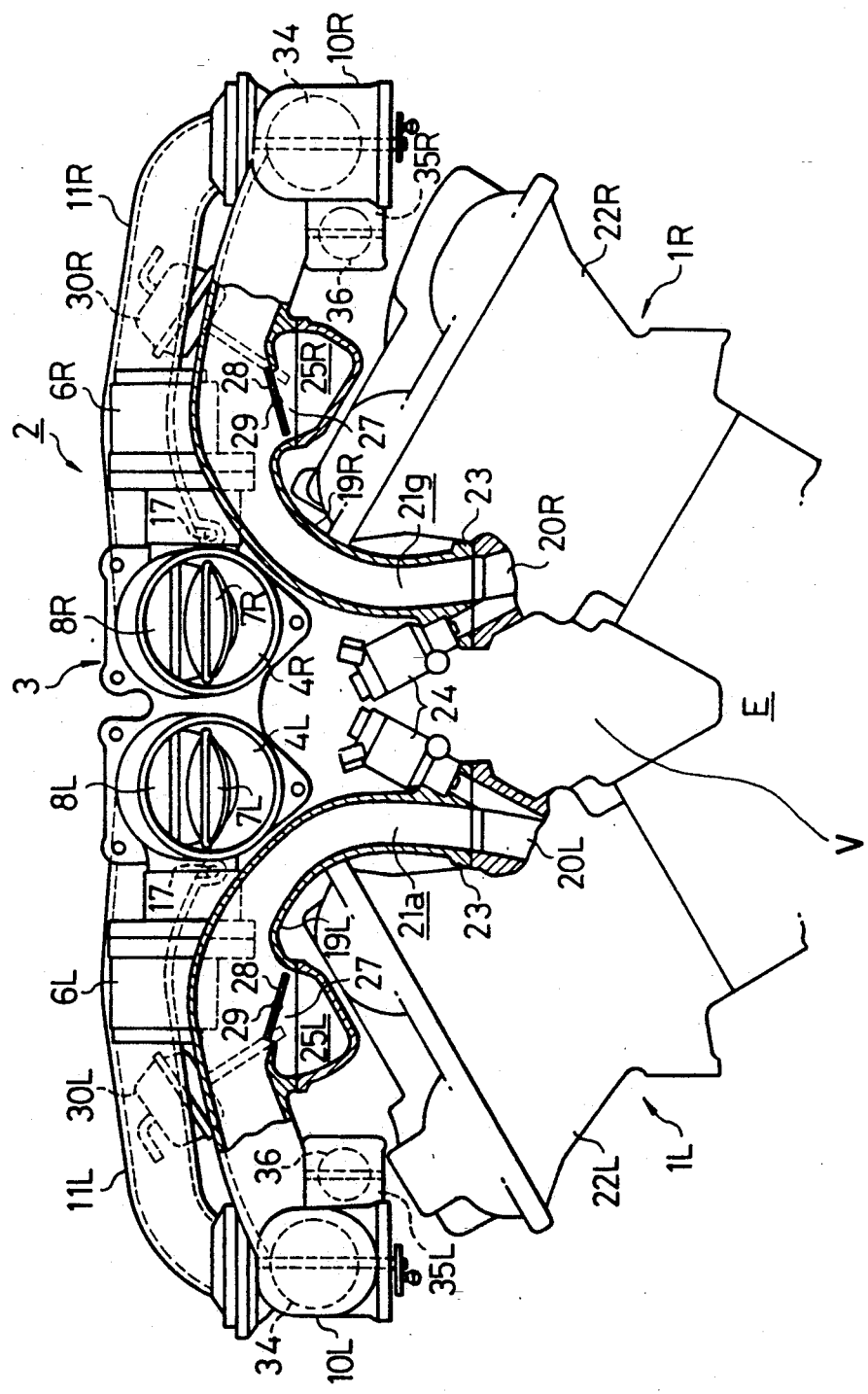
FIG. 2 is a partially sectional front view showing the state in which the intake manifold assembly of FIG. 1 is mounted the multi-cylinder combustion engine.

FIG. 1 is a partially cross-sectional plan view showing an intake manifold assembly and FIG. 2 is a partially cross-sectional front view showing the state in which the intake manifold assembly of FIG. 1 is mounted to a combustion engine E.

As shown in FIG. 1, the combustion engine E has two cylinder banks, i.e. a right-hand cylinder bank 1R and a left-hand cylinder bank 1R, which are disposed to form a V-shaped central space V interposed between them. Each of the left-hand cylinder bank 1L and the right-hand cylinder bank 1R is provided with six cylinders in a row. The right-hand cylinder bank 1R is so disposed as to be offset rearwards (upwards in FIG. 1) by a predetermined distance with respect to the left-hand cylinder bank 1L.

An intake manifold assembly 2 has a two-bore type throttle body 3 at its uppermost upstream end. The intake manifold assembly 2 is disposed in a position located over the V-shaped central space V interposed between the left-hand and right-hand cylinder banks 1L and 1R and in a nearly middle position therebetween. Further, the intake manifold assembly 2 has an opening facing the front portion of the automotive vehicle (downwards in FIG. 1) while its rear portion thereof (upwards in FIG. 1) serves as a discharge outlet. A left-hand bore 4L for the left-hand cylinder bank 1L is disposed individually and independently from and parallel to a right-hand bore 4R for the right-hand cylinder bank 1R.

Within the left-hand bore 4L of the throttle body 3 are disposed a first left-hand throttle valve 7L and a second left-hand throttle valve 8L. Likewise, within the right-hand bore 4R of the throttle body 3 are disposed a first right-hand throttle valve 7R and a second right-hand throttle valve 8R. The first left-hand throttle valve 7L and the second left-hand throttle valve 8L are spaced apart in the direction in which a crank axis extends, while the first right-hand throttle valve 7R and the second right-hand throttle valve 8R are likewise disposed in a spaced relationship apart from each other in the direction of the crank axis. The first throttle valves 7L and 7R are disposed on the side upstream of the respective second throttle valves 8L and 8R. The first throttle valves 7L and 7R are each of a constantly open type which is operated so as to be electrically closed by direct current motors 6L and 6R mounted to left-hand and right-hand outer walls of the throttle body 3 through a deceleration mechanism 5, respectively. On the other hand, the second throttle valves 8L and 8R are each of a constantly closed type which is operated so as to be mechanically opened by depressing an accelerator pedal. The first throttle valves 7L and 7R drivable by the respective direct current motors 6L and 6R are employed for traction control in order to prevent the driven wheel from causing a large slip or spin. Each of the four throttle valves 7L, 7R, 8L and 8R is so arranged as to be pivotable about an axis extending horizontally in the leftward-to-rightward direction. As is apparent from FIG. 1, the left-hand motor 6L is mounted on the left-hand cylinder bank 1L so as to offset in the forward direction from the right-hand motor 6R mounted on the right-hand cylinder bank 1R by the distance and in the direction in which the left-hand cylinder bank 1L is offset from the right-hand cylinder bank 1R. In proportion to the positions in which the the left-hand motor 6L is offset from the right-hand motor 6R, the left-hand electrically drivable throttle valve 7L is offset from the right-hand electrically drivable throttle valve 7R in the forward direction. Further, the left-hand and right-hand motors 6L and 6R themselves are offset in the rearward directions from the left-hand and right-hand throttle valves 7L and 7R, respectively, and they are disposed in the vicinity of a centeral position of the throttle body 3 in the direction which extends forwards or rearwards.

Figure 3:
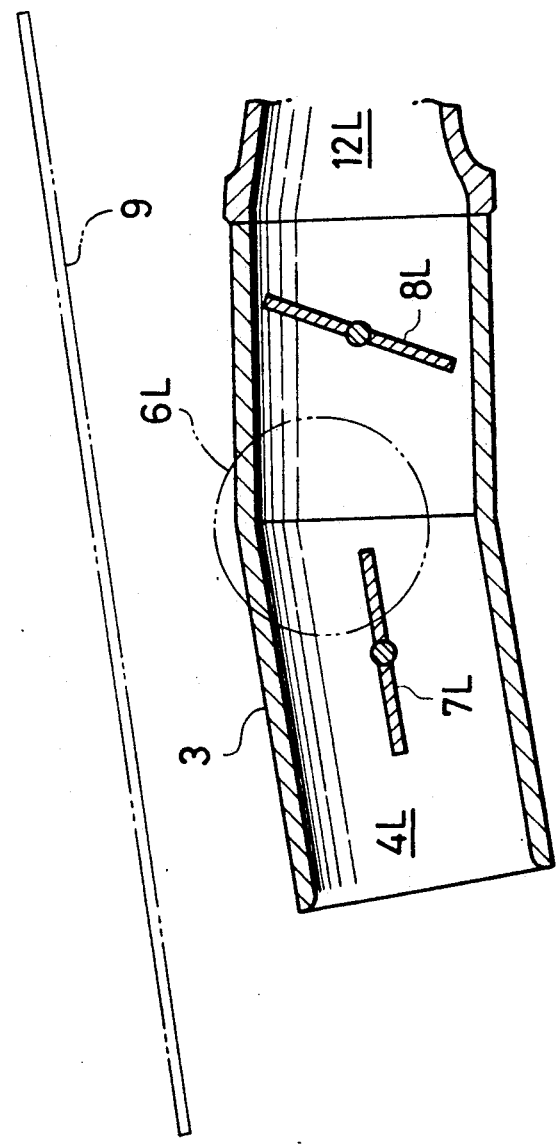
FIG. 3 is a sectional view of a throttle body.

As is apparent from FIG. 3, a forward portion of the throttle body 3 to which the electrically drivable throttle valves 7L and 7R are mounted is so disposed as to lean downwards in the forward direction so as to follow the angle at which a bonnet 9 leans in order to lower the height of the bonnet of the automotive vehicle body. The axes of the forward portions of the bores 4L and 4R are likewise leaned downwards in the forward direction of the automotive vehicle body.

A longitudinally long and narrow left-hand surge tank 10L is so disposed over the left-hand cylinder bank 1L as to extend in the forward-to-rearward direction, i.e. in the direction which the crank axis extends, while a longitudinally long and narrow right-hand surge tank 10R is so disposed over the right-hand cylinder bank 1R as to extend in the direction of the crank axis. A pair of the left-hand and right-hand surge tanks 10L and 10R are disposed parallel to each other and connected to the throttle body 3 through a pair of left-hand and right-hand upstream intake manifolds 11L and 11R, respectively, led from a rear end portion of the throttle body 3.

As shown in FIGS. 1 and 2, the left-hand upstream intake manifold 11L serves as a merged intake passage which comprises a common merged intake passage 12L and branch merged intake passages 13L and 14L, a common merged intake passage 12L so disposed as to be curved to the left in the drawings from a rear end portion of the left-hand bore 4L of the throttle body 3 and branch merged intake passages 13L and 14L branching from the common merged intake passage 12L. The downstream ends of the branch merged intake passages 13L and 14L are communicated to the left-hand surge tank 10L through openings 16 and 15 disposed on a top wall of the left-hand surge tank 10L in an arrangement spaced apart from each other, respectively.

Likewise, the right-hand upstream intake manifold 11R serves as a merged intake passage which comprises a common merged intake passage 12R and branch merged intake passages 13R and 14R, a common merged intake passage 12R so disposed as to be curved to the left in the drawings from a rear end portion of the right-hand bore 4R of the throttle body 3 and branch merged intake passages 13R and 14R branching from the common merged intake passage 12R. The downstream ends of the branch merged intake passages 13R and 14R are communicated to the right-hand surge tank 10R through openings 16 and 15 disposed on a top wall of the right-hand surge tank 10R in an arrangement spaced apart from each other, respectively.

Each of the left-hand and right-hand common intake passages 12L and 12R has an opening at their bottom portions for circulating blow-by gases or other additive gases to an intake system.

A pipe 18 is integrally led from each of the left-hand and right-hand upstream intake manifolds 11L and 11R so as to face the intake outlet of the throttle body 3, and the pipes 18 form bypass passages 33L and 33R, respectively. The throttle body 3 is integrally connected to the left-hand and right-hand upstream intake manifolds 11L and 11R, and the left-hand upstream intake manifold 11L branches into the left-hand branch merged intake passages 13L and 14L which are detachably mounted at their downstream end portions to the left-hand surge tank 10L. Likewise, the right-hand upstream intake manifold 11R branches into the right-hand branch merged intake passages 13R and 14R which in turn are detachably mounted at their downstream end portions to the right-hand surge tank 10R.

Underneath the left-hand upstream intake manifold 11L is disposed a left-hand downstream intake manifold 19L formed integrally with the left-hand surge tank 10L. Underneath the right-hand upstream intake manifold 11R is disposed a right-hand downstream intake manifold 19R formed integrally with the right-hand surge tank 10R. The left-hand downstream intake manifold 19L has six independent intake passages 21a to 21f, inclusive, disposed in this order from the forward side and connected to the left-hand surge tank 10L at their one ends and to intake ports 20L for the six cylinders disposed in the left-hand cylinder bank 1L at their other ends, respectively. The downstream intake manifold 19L has a flange portion 23 so disposed at its downstream end as to fix the downstream intake manifold 19L to a cylinder head 22L of the left-hand cylinder bank 1L. Three of the six independent intake passages 21a to 21f, i.e. independent intake passages 21a, 21b and 21c, on the forward side are arranged closely to each other and connected to the forward portion of the left-hand surge tank 10L, while the other three of the six independent intake passages 21a to 21f, i.e. independent intake passages 21d, 21e and 21f, on the rearward side are likewise arranged closely to each other and connected to the rearward portion thereof. The left-hand motor 6L is disposed as if embedded in a space formed in a generally middle portion formed and interposed between the forward and rearward groups of the independent intake passages.

Likewise, the right-hand downstream intake manifold 19R has six independent intake passages 21g to 21l, inclusive, disposed in this order from the forward side and connected to the right-hand surge tank 10R at their one ends and to intake ports 20R for the six cylinders disposed in the right-hand cylinder bank 1R at their other ends, respectively. The downstream intake manifold 19R has a flange portion 23 so disposed at its downstream end as to fix the downstream intake manifold 19R to a cylinder head 22R of the right-hand cylinder bank 1R. Three of the six independent intake passages 21g to 21l, i.e. independent intake passages 21g, 21h and 21i, on the forward side are arranged closely to each other and connected to the forward portion of the right-hand surge tank 10R, while the other three of the six independent intake passages 21g to 21l, i.e. independent intake passages 21j, 21k and 21l, on the rearward side are likewise arranged closely to each other and connected to the rearward portion thereof. The right-hand motor 6R is disposed as if embedded in a space formed in a generally middle portion formed and interposed between the forward and rearward groups of the independent intake passages.

To each of the flange portion 23 of the downstream intake manifolds 19L and 19R is mounted a fuel injection valve 24 so as to encounter each of the independent intake passages 21a to 21l, inclusive.

Between the left-hand downstream intake manifold 19L and the left-hand cylinder bank 1L is disposed a longitudinally long and narrow volume chamber 25L which is integrally formed with the downstream intake manifold 19L and which extends parallel to the left-hand surge tank 10L. To the left-hand volume chamber 25L is communicated each of the independent intake passages 21a to 21f, inclusive, through a short connecting passage 27, as shown in FIG. 2. Each of the connecting passages 27 has a third opening-closing valve 28 which in turn is mounted to a common operating shaft 29L so disposed as to extend over the longitudinally entire length of the left-hand volume chamber 25L and which is so arranged as to be pivotable by an actuator 30L together with the other third opening-closing valves 28. The third opening-closing valves 28 function as switching the number of revolutions of the combustion engine for supercharging in synchronism with inertia, as will be described hereinafter.

A pipe 31 is led from the rear end of the volume chamber 25L, and the pipe 31 is communicated through a connecting pipe 32 to the pipe 18 led from the rearward end portion of the upward intake manifold 11L, thereby forming a bypass passage 33L communicating the left-hand merged intake passage 12L to the left-hand volume chamber 25L.

Likewise, a longitudinally long and narrow volume chamber 25R is disposed between the right-hand downstream intake manifold 19R and the right-hand cylinder bank 1R and the volume chamber 25R is integrally formed with the downstream intake manifold 19R and which extends parallel to the right-hand surge tank 10R. To the right-hand volume chamber 25R is communicated each of the independent intake passages 21g to 21l, inclusive, through a short connecting passage 27, as shown in FIG. 2. Each of the connecting passages 27 has a third opening-closing valve 28 which in turn is mounted to a common operating shaft 29R so disposed as to extend over the longitudinally entire length of the right-hand volume chamber 25R and which is so arranged as to be pivotable by an actuator 30R together with the other third opening-closing valves 28. The third opening-closing valves 28 function as switching the number of revolutions of the combustion engine for supercharging in synchronism with inertia, as will be described hereinafter. A pipe 31 is led from the rear end of the connecting tank 25R and connected through a connecting pipe 32 to the pipe 18 led from the rear end of the upstream end of the upstream intake manifold 11R, thereby forming a bypass passage 33R communicating the merged intake passage 12R to the volume chamber 25R.

On the other hand, each of the surge tanks 10L and 10R has a second opening-closing valve 34 for switching the number of revolutions of the combustion engine for supercharging in synchronism with resonance, which is disposed in an intermediate portion extending in the direction of the crank axis, i.e. in the forward-to-rearward direction of the automotive vehicle body. When the second opening-closing valve 34 is opened, on the one hand, one big chamber is formed within each of the left-hand and right-hand surge tanks 10L and 10R over their entire length, thereby allowing all the left-hand independent intake passages 21a to 21f, inclusive, to be communicated to each other through the left-hand surge tank 10L and allowing all the right-hand independent intake passages 21g to 21l, inclusive, to be communicated to each other through the right-hand surge tank 10R, respectively. When the second opening-closing valve 34 is closed, on the other hand, each of the left-hand and right-hand surge tanks 10L and 10R is divided into two chambers, i.e. a first chamber 10a and a second chamber 10b. The forward first chamber 10a of the left-hand surge tank 10L serves as communicating the three independent intake passages 21a, 21b and 21c to each other, while the rearward second chamber 10b thereof serves as communicating the three independent intake passages 21d, 21e and 21f to each other. Intake air is fed to the forward first chamber 10a through an opening 15 from a left-hand branch intake passage 13L. Likewise, the forward chamber 10a of the right-hand surge tank 10R allows the three independent intake passages 21g, 21h and 21i to be communicated to each other while the rearward second chamber 10b thereof allows the other three independent intake passages 21*j*, 21*k* and 21*l* to be communicated to each other.

Underneath the independent intake passages 21*b*, 21*c*, 21*d* and 21*e* and between the left-hand surge tank 10L and the left-hand cylinder bank 1L is disposed a volume chamber 25L, and an outside wall of the volume chamber 35L is integrally connected to and formed with an inside wall of the left-hand surge tank 10L, thereby communicating the forward first chamber 10*a* of the left-hand surge tank 10L to the rearward second chamber 10*b* thereof. Likewise, a volume chamber 25R is disposed underneath the independent intake passages 21*h*, 21*i*, 21*j* and 21*k* and between the right-hand surge tank 10R and the right-hand cylinder bank 1R. The volume chamber 35R is so disposed as to communicate the forward first chamber 10*a* of the right-hand surge tank 10R to the rearward second chamber 10*b* thereof.

Each of the left-hand and right-hand volume chambers 35L and 35R has a first opening-closing valve 36 disposed in an intermediate portion extending in the direction of the crank axis, i.e. in the forward-to-rearward direction of the automotive vehicle body, the first opening-closing valve 36 being operable by an actuator (not shown) for switching the number of revolutions of the combustion engine for supercharging in synchronism with resonance. The length of each of the left-hand and right-hand volume chambers 35L and 35R is set shorter than the length of each of the branch intake passages 13L, 14L, 13R and 14R.

Description will be made of the dynamic effect of intake air in accompany with the first opening-closing valve 36, the second opening-closing valve 34 and the third opening-closing valve 28. It is to be noted herein that the order of ignition of the cylinders, i.e. intake stroke, is set under conditions as will be described hereinafter. In other words, the cylinders connected to the independent intake passages 21*a*, 21*b* and 21*c* are so disposed as not to be ignited adjacent each other, while the cylinders connected to the independent intake passages 21*d*, 21*e* and 21*f* are so disposed as not to be ignited adjacent each other. Likewise, the cylinders connected to the independent intake passages 21*g*, 21*h* and 21*i* are so disposed as not to be ignited adjacent each other while the cylinders connected to the independent intake passages 21*h*, 21*i* and 21*l* are so disposed as not to be ignited adjacent each other.

More specifically, the order of ignition of the cylinders may be represented, for example, in the following way, when indicated by the reference numerals of the independent intake passages: 21*f*→21*g*→21*b*→21*k*→21*d*→21*i*→21*a*→21*l*→21*e*→21*h*→21*c*→21*j*.

Supplementary description will be made of the left-hand surge tank 10L, the independent intake passages 21*a* to 21*f*, inclusive, and the merged intake passage 11L on the left-hand cylinder bank 1L as a representative example.

The intake port 10L has an opening on the inner side of the cylinder head 22L so as to face the V-shaped central space V of the V-cylinder bank. The surge tank 10L is disposed in the vicinity of the outer side of the cylinder head 22L so as to extend longitudinally in the direction in which the crank axis extends.

Each of the independent intake passages 21*a* to 21*f*, inclusive, is mounted to the inner side of the surge tank 10L facing the V-shaped central space V of the V-cylinder bank. And each of the independent intake passages 21*a* to 21*f* is so disposed as to extend upwards within the V-shaped central space V of the V-cylinder bank up to a position over the cylinder head 10L and then to be curved toward the left-hand surge tank 10L, i.e. in the direction apart from the V-shaped central space V of the V-cylinder bank, and to extend generally horizontally over the cylinder head 10L. With the arrangement for the independent intake passages 21*a* to 21*f*, inclusive, in the manner as described hereinabove, as will readily be understood particularly from FIG. 2, a space is formed in an area surrounded by the cylinder head 22L, the independent intake passages 21*a* to 21*f* and the left-hand surge tank 10L, and the volume chambers 25L and 35L are disposed within this space.

In particular, as shown in FIG. 2, the independent intake passages 21*a* to 21*f* are disposed to extend generally horizontally over the cylinder head 22L and the left-hand surge tank 10L is disposed in a position immediately close to an outer portion of the top wall of the cylinder head 22L, so that the space surrounded by the independent intake passages 21*a* to 21*f* and the left-hand surge tank 10L in association with the sloped top surface of the cylinder head 22L assumes a generally triangular form in section.

The merged intake passage 11L is constructed in such a manner that its branch merged intake passages 13L and 14L extend from the upper wall of the left-hand surge tank 10L toward the V-shaped central space V of the V-cylinder bank over the left-hand cylinder head 22L and they are merged into the common merged intake passage 12L over the cylinder head 22L. The common merged intake passage 12L further extends in the direction of the crank axis over the V-shaped central space V of the V-cylinder bank and it is connected to the throttle body 3.

The arrangement for the right-hand cylinder bank 1R is substantially symmetrical with that for the left-hand cylinder bank 1L so that duplicate description will be omitted. It is to be noted herein that the common merged intake passage 12L is disposed in the position closer to the left-hand cylinder bank 1L over the V-shaped central space V of the V-cylinder bank, while the common merged intake passage 12R is disposed in the position closer to the right-hand cylinder bank 1R over the V-shaped central space V thereof, in order for the left-hand common merged intake passage 12L to cause no interference with the right-hand common merged intake passage 12R. Each of the opening-closing valves 28, 34 and 36 is opened or closed in accordance with the number of revolutions of the combustion engine in the following way.

Figure 4:
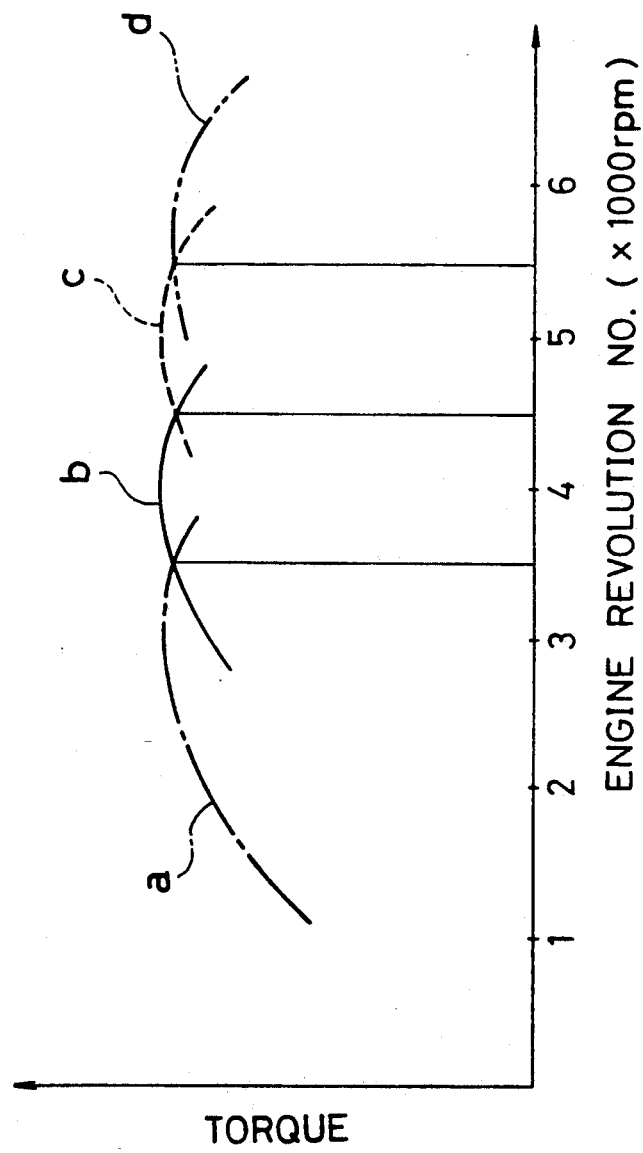
FIG. 4 is a graph showing torque characteristic in accompany with opening or closing an opening-closing valve in accordance with the number of revolutions of the combustion engine.

1. All the opening-closing valves 28, 34 and 36 are closed when the number of revolutions of the combustion engine is in a first rotation region of 3,500 rpm or lower. Hence, immediate upstream portions of the branch merged intake passages 13L, 13R, 14L and 14R serve as portions where the pressure is reversed, where supercharging is effected in synchronism with resonance, as indicated by the dot-dash line a in FIG. 4.

2. When the number of revolutions of the combustion engine is in a second rotation region ranging from 3,500 rpm to 4,500 rpm, the opening-closing valves 28 and 34 are closed and only the opening-closing valves 36 disposed within the left-hand and right-hand volume chambers 35L and 35R are opened, thereby effecting supercharging in synchronism with resonance within the left-hand and right-hand volume chambers 35L and 35R functioning as common passages, as indicated by the solid line b in FIG. 4.

3. When the number of revolutions of the combustion engine is in a third rotation region ranging from 4,500 rpm to 5,500 rpm, only the twelve opening-closing valves 28 are closed and the opening-closing valves 34 and 36 are opened, thereby effecting supercharging in synchronism with inertia within the left-hand and right-hand surge tanks 10L and 10R functioning as portions in which the pressures are reversed, as indicated by the dot line c in FIG. 4.

4. All the opening-closing valves 28, 34 and 36 are opened when the number of revolutions of the combustion engine exists in a fourth rotation region exceeding 5,500 rpm. The opening of all the opening-closing valves 28, 34 and 36 allows supercharging to be effected in synchronism with inertia within the left-hand and right-hand volume chambers 25L and 25R functioning as portions in which the pressures are reversed. Further, the opening of the opening-closing valves 28 allows intake air to pass from the common merged intake passages 12L and 12R through the bypass passages 33L and 33R to the volume chambers 35L and 35R and then through the connecting passage 27 to each of the independent intake passages 21a to 21l, inclusive, thereby further improving supercharging efficiency, as indicated by the two-dot-and-dash line d in FIG. 4.

As is apparent from the foregoing description, the space formed within the combustion engine can effectively be utilized and vibration of an intake system can be controlled by disposing the opening-closing valves 36 for switching the number of revolutions for supercharging in synchronism with resonance in the position underneath the independent intake passages 21a to 21f and between the left-hand surge tank 10L and the left-hand cylinder head 22L and in the position underneath the independent intake passages 21g to 21l and between the right-hand surge tank 10R and the right-hand cylinder head 22R.

Further, the space is formed on the side of the left-hand downstream intake manifold 19L between the forward group of the three independent intake passages 21a, 21b and 21c and the rearward group of the three independent intake passages 21d, 21e and 21f, while the space is formed on the side of the right-hand downstream intake manifold 19R between the forward group of the three independent intake passages 21g, 21h and 21i and the rearward group of the three independent intake passages 21j, 21k and 21l. And the motor 6L for driving the throttle valve 7L is mounted to the throttle body 3 within the space formed in the manner as described hereinabove so as to be offset from the motor 6R for driving the throttle valve 7R mounted to the throttle body 3 within the space formed in the manner as described hereinabove. The position of mounting the left-hand motor 6L is offset from the position of mounting the right-hand motor 6R in the amount and in the direction in which the left-hand cylinder bank 1L is offset from the right-hand cylinder bank 1R. The arrangement of the independent intake passages can secure the generally central disposition of the throttle body 3 between the left-hand and right-hand cylinder banks 1L and 1R and allows the left-hand and right-hand motors 6L and 6R to be disposed within the respective spaces formed on the downstream intake manifolds 19L and 19R, thereby making the structure of the intake system compact and simplifying the structure of the combustion as a whole.

The disposition of the electrically operable throttle valves 7L and 7R drivable by the motors 6L and 6R on the upstream side of the respective mechanically operable throttle valves 8L and 8R can provide spacial freedom in disposing the motors 6L and 6R without interference with the common surged intake passages 12L and 12R and the branch merged intake passages 13L, 14L and 13R, 14R, those merged intake passages being disposed to connect the downstream end of the throttle body 3 to the respective left-hand and right-hand surge tanks 10L and 10R.

Further, the arrangement according to the present invention can allow the throttle body 3 to readily support the heavy motors 6L and 6R mechanically because the the motors 6L and 6R are unevenly mounted in such a manner that the left-hand throttle valve 7L is offset from the right-hand throttle valve 7R toward the central side in the direction in which the throttle body 3 extends forwards or rearwards. Further, reliability of the throttle body 3 can be improved.

As is apparent from FIG. 3, the portion of the throttle body 3 at which the electrically operable throttle valves 7L and 7R are mounted are so disposed as to lean downward in the forward direction of the automotive vehicle body so that this arrangement of the throttle body 3 makes the height of the bonnet of the automotive vehicle body lower.

Further, the bypass passages 33L and 33R are disposed so as to communicate the merged intake passages 12L and 12R with the volume chambers 25L and 25R forming the pressure-reversing portions when the first opening-closing valves 28 are opened in such a high rotation region as the number of revolutions of the combustion engine being as high as 5,500 rpm or higher. And the pipe 18 is disposed in the position facing the intake air outlet of the throttle body 3 in order to form the bypass passages 33L and 33R. Hence, when the combustion engine rotates at a high speed and the first opening-closing valves 28 are opened, intake air is led from the common merged intake passages 12L and 12R through the bypass passages 33L and 33R directly to the volume chambers 25L and 25R, thereby supplying the intake air to each of the independent intake passages 21a to 21l, inclusive, and merging the intake air with the intake air fed via the surge tanks 10L and 10R, respectively. Accordingly, this arrangement can improve volume efficiency of the intake air at the time when the number of revolutions of the combustion engine is high.

Furthermore, the opening 17 is disposed to the common merged intake passages 12L and 12R for circulating the blow-by gases to the intake system so as to evenly distribute the blow-by gases to each of the cylinders in order to avoid irregular distribution of an air-fuel ratio of mixed gases because the blow-by gases contain fuel and oil. The arrangement of the opening 17 in the common merged intake passages 12L and 12R can serve as improving distribution of the blow-by gases by circulating the blow-by gases to the intake system through the opening 17. It is further preferred to dispose an outlet of an EGR passage in the respective common intake passages 12L and 12R for circulating part of the exhaust gases to the intake system for the reasons as described hereinabove, although not shown in the accompanying drawings.

It is further advantageous to dispose a connecting passage, although not shown, so as to communicate the left-hand volume chamber 25L to the right-hand volume chamber 25R, volume chambers functioning as a portion at which the pressure is reversed when the number of revolutions of the combustion engine is high.

The disposition of this connecting passage can serve as reducing resistance to intake air when the first opening-closing valves 28 are opened as well as improve a variation of the air-fuel ratios between the left-hand and right-hand cylinder banks 1L and 1R.

It is to be understood that the present invention is not restricted to those embodiments described hereinabove as illustrative, not as restrictive, and the invention should be interpreted to encompass modifications and variations within the spirit and scope of the present invention.

What is claimed is:

1. An intake system for a multi-cylinder combustion engine, comprising:
   a surge tank disposed over a cylinder head of the combustion engine;
   an independent intake passage connecting the surge tank to an intake port for each of cylinders of the combustion engine; and
   a volume portion constituting a volume chamber disposed within a space formed among and surrounded by the independent intake passage, the surge tank and the cylinder head so as to gain dynamic effect of intake air.

2. An intake system as claimed in claim 1, wherein the volume portion is for effecting supercharging in synchronism with resonance.

3. An intake system as claimed in claim 1, wherein the volume portion is for effecting supercharging in synchronism with inertia.

4. An intake system as claimed in claim 1, wherein two volume portions are provided for one cylinder head;
   one of the volume portions is for effecting supercharging in synchronism with resonance; and
   the other of the volume portions is for effecting supercharging in synchronism with inertia.

5. An intake system as claimed in claim 2, wherein the volume portion is integrally disposed to a side wall of the surge tank in a position underneath the independent intake passage.

6. An intake system as claimed in claim 3, wherein:
   the volume portion is integrally formed with a bottom wall of each of independent intake passages; and
   the independent intake passages are communicated to each other in a position apart in equal distance from the intake port.

7. An intake system as claimed in claim 6, wherein a connecting portion for communicating the volume portion to each of the independent intake passages is provided with an opening-closing valve.

8. An intake system as claimed in claim 2, wherein:
   the surge tank is divided into a first chamber and a second chamber;
   a group of plural independent intake passages are connected to a portion corresponding to the first chamber, plural independent intake passages being so arranged for their intake strokes not to be adjacent to each other;
   another group of plural independent intake passages are connected to a portion corresponding to the second chamber, plural independent intake passages being so arranged for their intake strokes not to be adjacent to each other; and
   an upstream portion of a first merged intake passage for supplying intake air to the portion corresponding to the first chamber is merged with an upstream portion of a second merged intake passage for supplying intake air to the portion corresponding to the second merged intake passage.

9. An intake system as claimed in claim 8, wherein the first chamber is communicated to the second chamber through the volume portion in a length shorter than a length in which the first chamber is communicated to the second chamber through the first merged intake passage and the second merged intake passage.

10. An intake system as claimed in claim 9, wherein the volume portion has a first opening-closing valve disposed so as to allow the first chamber to be connected to or disconnected from the second chamber through the volume portion.

11. An intake system as claimed in claim 10, wherein the surge tank has a second opening-closing valve disposed so as to allow the first chamber to be connected to or disconnected from the second chamber.

12. An intake system as claimed in claim 11, wherein:
   another volume portions for defining other volume chambers are disposed in a space formed among the independent intake passage, the surge tank and the cylinder head;
   the another volume portions are communicated to each other in a position in which each of the independent intake passages is apart in equal distance from the intake port; and
   a third opening-closing valve is so disposed as to allow the another volume portions to be connected to or disconnected from each of the independent intake passages.

13. An intake system as claimed in claim 12, wherein:
   a region in which the number of revolutions of the combustion engine ranges from a low rotation side to a high rotation side comprising a first rotation region, a second rotation region, a third rotation region and a fourth rotation region;
   the first opening-closing valve, the second opening-closing valve and the third opening-closing valve are closed in the first rotation region;
   the first opening-closing valve is opened and the second opening-closing valve and the third opening-closing valve are closed in the second rotation region;
   the first opening-closing valve and the second opening-closing valve are opened and the third opening-closing valve is closed in the third rotation region; and
   the first opening-closing valve, the second opening-closing valve and the third opening-closing valve are opened in the fourth rotation region.

14. An intake system as claimed in claim 12, wherein the another volume portion is disposed integrally with a bottom wall of the independent intake passage.

15. An intake system as claimed in claim 1, wherein:
   the intake port has an opening on a one side of the cylinder head;
   the surge tank is disposed in the vicinity of another side of the cylinder head and extends longitudinally in a direction in which a crank axis extends; and
   the independent intake passage is so disposed as to extend upwards from the one side of the cylinder head, to be curved toward the another side of the cylinder head over the cylinder head and to be connected to a side wall of the surge tank.

16. An intake system as claimed in claim 15, wherein:

the surge tank is divided into a first chamber and a second chamber in a direction in which a crank axis extends;

a group of plural independent intake passages are connected to a portion corresponding to the first chamber, plural independent intake passages being so arranged for their intake strokes not to be adjacent to each other;

another group of plural independent intake passages are connected to a portion corresponding to the second chamber, plural independent intake passages being so arranged for their intake strokes not to be adjacent to each other; and a first merged intake passage for supplying intake air to the portion corresponding to the first chamber and a second merged intake passage for supplying intake air to the portion corresponding to the second merged intake passage are connected to a top wall of the surge tank; and each of the first merged intake passage and the second merged intake passage extends from the surge tank toward the another side of the cylinder head and is merged at its upstream portion with each other.

17. An intake system as claimed in claim 3, wherein the volume portion extends in the direction in which the crank axis extends.

18. An intake system as claimed in claim 3, wherein:
a third opening-closing valve is further disposed so as to allow the volume portion to be connected to or disconnected from each of the independent intake passages;

the surge tank is divided into a first chamber and a second chamber so as to allow the independent intake passages to be communicated to each other; and a second opening-closing valve is further disposed in the surge tank so as to allow the first chamber to be connected to or disconnected from the second chamber.

19. An intake system as claimed in claim 1, wherein:
the combustion engine is a V-type multicylinder combustion engine having a pair of left-hand and right-hand cylinder banks, or a pair of left-hand and right-hand cylinder heads; and each of the left-hand and right-hand cylinder heads is provided individually and independently with the surge tank, the independent intake passages and the volume portion.

20. An intake system as claimed in claim 19, wherein:
each intake port has an opening on a one side of each of the left-hand and right-hand cylinder heads, which functions as a side of a V-shaped central space of a V-cylinder bank;

a left-hand surge tank for the left-hand cylinder head is so disposed as to extend in the direction of the crank axis in the vicinity of another side of the left-hand cylinder head while a right-hand surge tank for the right-hand cylinder head is so disposed as to extend in the direction of the crank axis in the vicinity of another side of the right-hand cylinder head;

each of left-hand independent intake passages for the left-hand cylinder head is so disposed as to extend upwards within the V-shaped central space of the V-cylinder bank and then to extend toward the left-hand surge tank over the left-hand cylinder head; and each of right-hand independent intake passages for the right-hand cylinder head is so disposed as to extend upwards within the V-shaped central space of the V-cylinder bank and then to extend toward the right-hand surge tank over the right-hand cylinder head.

21. An intake system as claimed in claim 20, wherein:
the left-hand independent intake passages are connected to the side of the left-hand surge tank on the side of the V-shaped central space of the V-cylinder bank; and the right-hand independent intake passages are connected to the side of the right-hand surge tank on the side of the V-shaped central space of the V-cylinder bank.

22. An intake system as claimed in claim 21, wherein:
the left-hand merged intake passage for supplying intake air to the left-hand surge tank is connected to a top wall of the left-hand surge tank; and the right-hand merged intake passage for supplying intake air to the right-hand surge tank is connected to a top wall of the right-hand surge tank.

23. An intake system as claimed in claim 22, wherein:
the left-hand merged intake passage is so disposed as to extend from the left-hand surge tank toward the V-shaped central space of the V-cylinder bank and so curved as to extend toward the direction of the crank axis over the V-shaped central space of the V-cylinder bank;

the right-hand merged intake passage is so disposed as to extend from the right-hand surge tank toward the V-shaped central space of the V-cylinder bank and so curved as to extend toward the direction of the crank axis over the V-shaped central space of the V-cylinder bank;

an upstream portion of the left-hand merged intake passage located over the V-shaped central space of the V-cylinder bank is so disposed as to be located in a position closer to the left-hand cylinder head while an upstream portion of the right-hand merged intake passage located over the V-shaped central space of the V-cylinder bank is so disposed as to be located in a position closer to the right-hand cylinder head;

the upstream portion of the left-hand merged intake passage is disposed parallel to the upstream portion of the right-hand merged intake passage; and a throttle body disposed over the V-shaped central space of the V-cylinder bank is connected individually and independently to an upstream end portion of each of the left-hand and right-hand merged intake passages.

24. An intake system as claimed in claim 23, wherein:
the throttle body has a first throttle valve and a second throttle valve which are disposed in a spaced arrangement apart from each other in the direction of the crank shaft for each of the left-hand and right-hand merged intake passages; and one of the first throttle valve and the second throttle valve is drivable by an electrically operable motor.

25. An intake system as claimed in claim 24, wherein:
one of the left-hand and right-hand cylinder banks is so disposed as to be offset from the other of the left-hand and right-hand cylinder banks in the direction of the crank axis; and a motor for the one of the left-hand and right-hand cylinder banks is offset from a motor for the other of the left-hand and right-hand cylinder banks in the direction of the crank axis.

26. An intake system as claimed in claim 22, wherein:
each of the left-hand and right-hand surge tanks is divided into a first chamber and a second chamber in the direction of the crank axis;
each of downstream portions of the left-hand and right-hand merged intake passages branch into two branch merged intake passages in its intermediate position, one of the two branch merged intake passage being communicated to the first chamber and the other of the two branch merged intake passages being communicated to the second chamber;
a group of the plural independent intake passages is connected to each of the first chamber and the second chamber;
plural cylinders for the plural independent intake passages connected to the first chamber are so set for intake stroke to be not adjacent to each other; and
plural cylinders for the plural independent intake passages connected to the second chamber are so set for intake stroke to be not adjacent to each other.

27. An intake system as claimed in claim 26, wherein:
each of the left-hand and right-hand volume portions for the respective left-hand and right-hand cylinder heads extends in the direction of the crank axis and communicates the corresponding plural independent intake passages to each other in equal distance from the respective intake ports;
a connecting portion for communicating each of the left-hand and right-hand volume portions to the corresponding independent intake passages is provided with a third opening-closing valve for allowing the respective volume portion to be connected to or disconnected from the independent intake passages; and
a bypass passage is further disposed so as to communicate an upstream portion of the merged intake passage upstream of the branch merged intake passage to the corresponding volume portion by bypassing the surge tank.

28. An intake system as claimed in claim 27, wherein the surge tank is provided with the second opening-closing valve so as to allow the first chamber of the surge tank to be connected to or disconnected from the second chamber thereof.

29. An intake system as claimed in claim 28, wherein:
the combustion engine is a V-type 12-cylinder combustion engine in which six cylinders are disposed in line on each of the left-hand and right-hand cylinder heads; and
three cylinders, or three independent intake passages, are connected to each of the first chamber and the second chamber of each of the left-hand and right-hand surge tank.

30. An intake system as claimed in claim 7, wherein the merged intake passage for supplying intake air to the surge tank is connected to the volume portion through a bypass passage for bypassing the surge tank.

31. An intake system as claimed in claim 12, further comprising a bypass passage for supplying intake air to the another volume portion from the merged intake passage by bypassing the surge tank.

* * * * *